(12) United States Patent
Gibbs

(10) Patent No.: US 8,746,110 B2
(45) Date of Patent: Jun. 10, 2014

(54) ATV PARKING BRAKE

(71) Applicant: Pierce IP Law Group PC, Salt Lake City, UT (US)

(72) Inventor: Ronnie D Gibbs, St. George, UT (US)

(*) Notice: Subject to any disclaimer, the term of this patent is extended or adjusted under 35 U.S.C. 154(b) by 0 days.

(21) Appl. No.: 13/694,402

(22) Filed: Nov. 29, 2012

(65) Prior Publication Data
US 2013/0174687 A1 Jul. 11, 2013

Related U.S. Application Data

(63) Continuation of application No. 12/655,246, filed on Dec. 28, 2009, now abandoned.

(51) Int. Cl.
G05G 1/04 (2006.01)

(52) U.S. Cl.
USPC ............................................. 74/523

(58) Field of Classification Search
USPC ............... 74/53, 481, 503, 519, 523, 542; 188/265
See application file for complete search history.

(56) References Cited

U.S. PATENT DOCUMENTS

| 2,030,753 | A |   | 2/1936  | McDonnell |
|-----------|---|---|---------|-----------|
| 2,777,335 | A | * | 1/1957  | Engberg et al. ................ 74/481 |
| 3,242,760 | A |   | 3/1966  | Keen et al. |
| 3,373,628 | A | * | 3/1968  | Lake et al. .................. 74/484 R |
| 3,472,094 | A | * | 10/1969 | Mortimer et al. .............. 74/481 |
| 3,838,756 | A |   | 10/1974 | Pottorff |
| 4,240,307 | A |   | 12/1980 | Yamazaki et al. |
| 4,993,509 | A | * | 2/1991  | Howell ........................ 180/333 |
| 4,998,983 | A | * | 3/1991  | Ruprecht et al. ............. 477/209 |

* cited by examiner

Primary Examiner — Vicky Johnson
(74) Attorney, Agent, or Firm — Pierce IP Law Group, PC

(57) ABSTRACT

An all terrain vehicle parking brake for after market installation on an ATV, UTV, RUV or MUV that relies on placing the vehicle shift lever in a park position to hold the vehicle on a hill. The parking brake includes a brake handle that is mounted to the vehicle dash board to pivot between brake engaged and disengaged positions, extending and retracting a linkage that connects and disconnects through a straight sleeve, with the linkage connecting to a rod end bearing that connects to a brake pedal arm, depressing the brake pedal when an operator activates the parking brake.

20 Claims, 4 Drawing Sheets

ATV PARKING BRAKE

RELATED APPLICATION

This application claims the benefit of U.S. patent application Ser. No. 12/655,246, filed on Dec. 28, 2009 and entitled "ATV PARKING BRAKE."

BACKGROUND

1. Field of the Invention

This invention relates to parking brakes for all terrain vehicles.

2. Prior Art

Previously, many all terrain vehicles, "ATV's," as have automatic transmissions have relied on placing the vehicle in park to hold it in place. Where, on level or nearly level ground, such is effective for holding the vehicle in place. However, should an operator stop the ATV on a slope and place the shift lever into "park" and release the foot brake, such operator will find that it is difficult to reposition the shift lever into "drive" as the weight of the vehicle will resist shift lever movement until the vehicle weight is taken off the vehicle transmission and linkage as by a person or persons pushing on the vehicle to neutralize the vehicle weight, removing that weight off of the transmission and linkage. Accordingly, in practice, an ATV operator who stops their vehicle on a slope and places the vehicle shift lever in "park" may find it difficult to reposition that shift lever into drive without exerting force on the shaft lever as many damage the vehicle transmission and/or linkage. The present invention addresses this problem by providing a linkage for maintaining a sufficient depressive force on the vehicle brake pedal to hold the vehicle in place without a reliance on a movement of the shift lever into "park." Which linkage is unique in that when a brake handle is rotated approximately ninety (90) degrees downwardly from the horizontal, a continuous column is provided to transmit a sufficient force onto the brake pedal, depressing and holding the vehicle brake pedal down, operating the vehicle breaking system. Whereas, when that brake handle is back to the horizontal through approximately ninety degrees, the linkage forming the column is released, disconnecting the linkage components from one another, and allowing the brake pedal to lift, insuring brake system release.

SUMMARY OF THE INVENTION

The invention relates to a parking brake arrangements for holding an all terrain vehicle (ATV), or the like, on a slope. Previously, an operator, to secure an ATV against rolling, would place a vehicle shift lever to "park." When such ATV in on an uphill slope when the shift lever is placed in "park," and the brake releases, a strain is placed on the transmission and linkage with the vehicle weight acting on the transmission, making it difficult or impossible to move the vehicle shift from "park" to "drive." In such a case, it is often necessary for an operator and/or others to physically push the vehicle up the slope to neutralize the vehicle weight that the vehicle weight directs into the transmission, so as to allow shift lever movement. Whereas, with an ATV that includes the parking brake of the invention, an operator, wishing to stop and hold the vehicle on a slope, engages the parking brake of the invention before they place the vehicle shift lever in "park." Thereby, the parking brake will hold the vehicle in place without placing a strain on the transmission and linkage as can be damaged by the operator trying to force the shift lever out of "park" with the weight of the vehicle acting on the transmission.

The parking brake of the invention is for an all terrain vehicle, such as the Polaris® RZR®, but can be used on like ATV's having a transmission arrangement like the Polaris® RZR®, and does not include a parking brake as original equipment. The parking brake of the invention includes a manual handle operated mechanical linkage whereby an operator, by manually downwardly pivoting the handle that is mounted to extend below the dash board, depresses and holds the vehicle brake pedal to prohibit vehicle movement. The invention provides a mechanical linkage from the handle to a rod end bearing that is pivot mounted to the side of an arm that is mounted to the vehicle brake pedal, whereby, manually moving the handle downwardly from the horizontal through approximately ninety (90) degrees, urges the brake pedal downwardly, operating the vehicle brakes, and will hold the brake pedal in place until the handle is manually moved back to its horizontal attitude, approximately perpendicular to the plane of a flat mounting bracket that is positioned below the vehicle dash board.

A component of the mechanical linkage is a rectangular block with t threaded end portion of a forward end that includes a center longitudinal opening that a solid round shaft is passed through. The rectangular block end opposite to the threaded end portion is pivotally mounted on its opposite sides to forward end of a link that connects at its rear end to right angle bends of parallel brackets that extend axially from the handle, and the ends of the brackets ends pivotally connect to the solid round shaft end. The rectangular block threaded end is to receive a nut turned thereover after the threaded end is passed through a hole in the flat mounting bracket that is connected at its ends to a vehicle dash board support frame.

To transfer an upward pivoting handle into outward travel of the mechanical linkage, so as to depress the vehicle brake, the solid round shaft extends axially from the block threaded end portion and is internally threaded at its forward end to receive a threaded end section of a first guide shaft. Which threaded end section terminates in a collar, and has a smooth forward section that is to fit within a sleeve, and a lock nut is turned onto the first guide shaft threaded end section. The opposite slide rod opposite end to fit into a first open end of a straight tube. The opposite or forward end of the straight sleeve is to receive a second guide shaft smooth end sections fitted therein. Which second guide shaft also includes a collar fixed at a junction with a threaded end section, and a lock nut is turned onto the second guide sleeve threaded end section. The second guide shafted threaded section end is turned into a threaded end of a shaft of a road end bearing that includes a bearing end for connection through a clevis pin to the brake pedal arm.

The first and second guide shaft smooth end sections are fitted onto opposite ends of the sleeve, whereby the sleeve is in contact with the collars, prohibiting contact of the guide shaft smooth section ends.

When the parking brake is not engaged, the handle points outwardly, perpendicular to the dash board. To engage the parking brake, the handle is pivoted downwardly, to essentially parallel attitude to the dash board. The downward movement of the handle extends the solid round shaft from the connector end of the rectangular block forming a column with the second guide shaft and connected rod end bearing that is connected to the brake pedal arm so as to depress the vehicle brake pedal.

It is a principal object of the invention to provide a parking brake for an all terrain vehicle, ATV, UTV, RUV or MUR, that includes a handle operated mechanical linkage whereby an operator, by manually pivoting a brake handle that is mounted below the vehicle dash board, can depress and hold the vehicle brake pedal against vehicle movement.

Another object of the invention is to provide a mechanical linkage from the handle, that is mounted below the vehicle dash board, to the side of the vehicle brake pedal arm, whereby manually moving the handle from a horizontal attitude through ninety (90) degrees downwardly pointing attitude extends a mechanical linkage to press the vehicle brake pedal downwardly, operating the vehicle brakes, so as to hold that brake pedal in place until the handle is manually pivoted upwardly, back to its horizontal attitude.

Another object of the invention is to provide a mechanical linkage that forms a column when the parking brake is operated to depress the vehicle brake pedal, and which mechanical linkage separates into unconnected components when the parking brake is released.

Another object of the invention is to provide a parking brake that is easy to install as an after market item and will provide a vehicle operator with a reliable alternative to a sue of an ATV, UTV, RUV, or MUV shift lever position in "park" to hold the vehicle on a slope.

Still another object of the invention is to provide an ATV parking brake that utilizes the pedal operated vehicle brake system as a parking brake, and will release the vehicle brake pedal by a rotation of a manually operated handle only.

DESCRIPTION OF THE DRAWINGS

The invention may take form in the arrangement of component parts that are herein shown as preferred embodiments and will be described in detail and illustrated in the accompanying drawings which form a part hereof.

DETAILED DESCRIPTION

Figure 1:
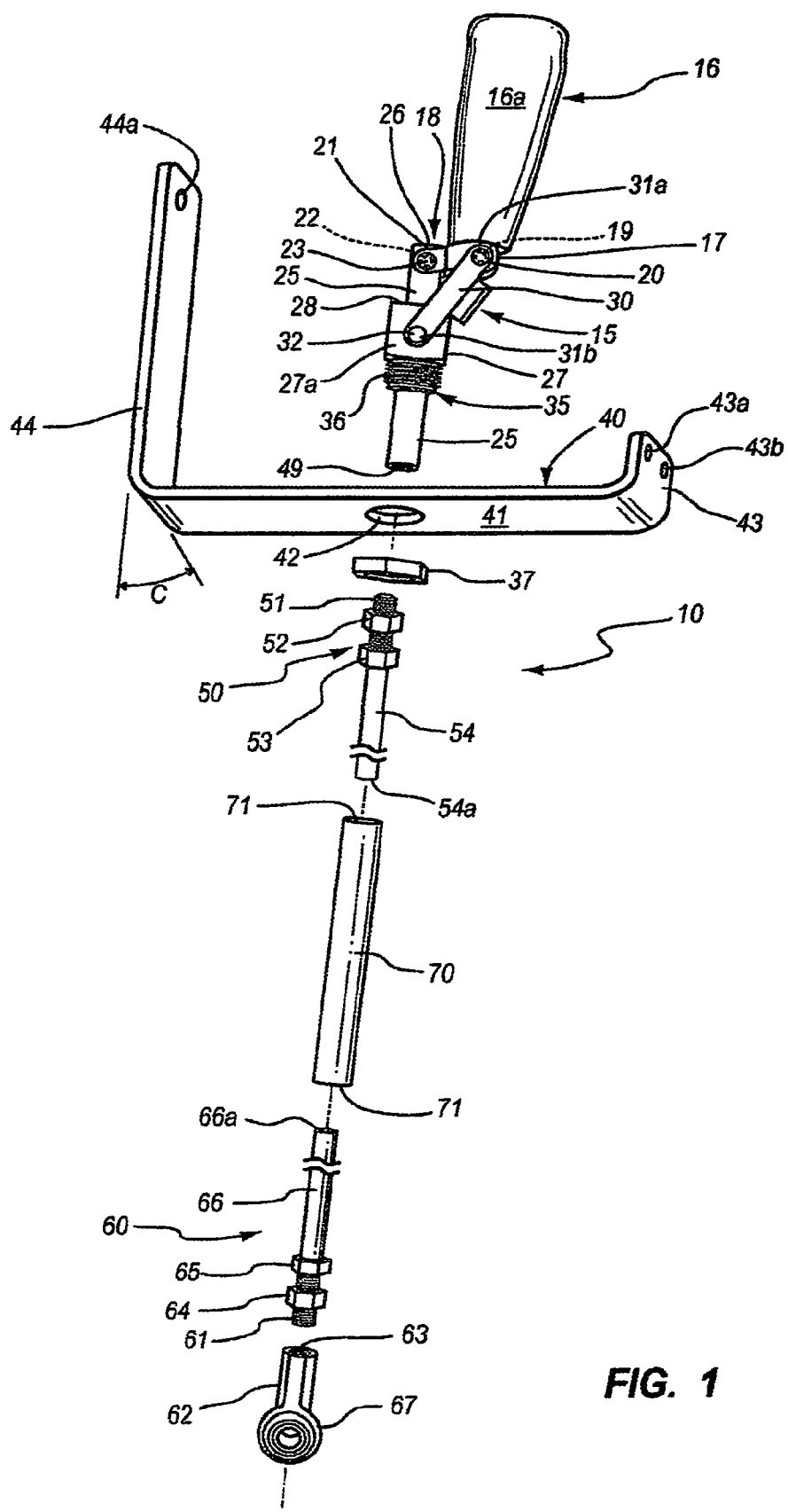
FIG. 1 shows a top plan perspective view of the major components of the ATV parking brake of the invention shown exploded apart.
Figure 2:
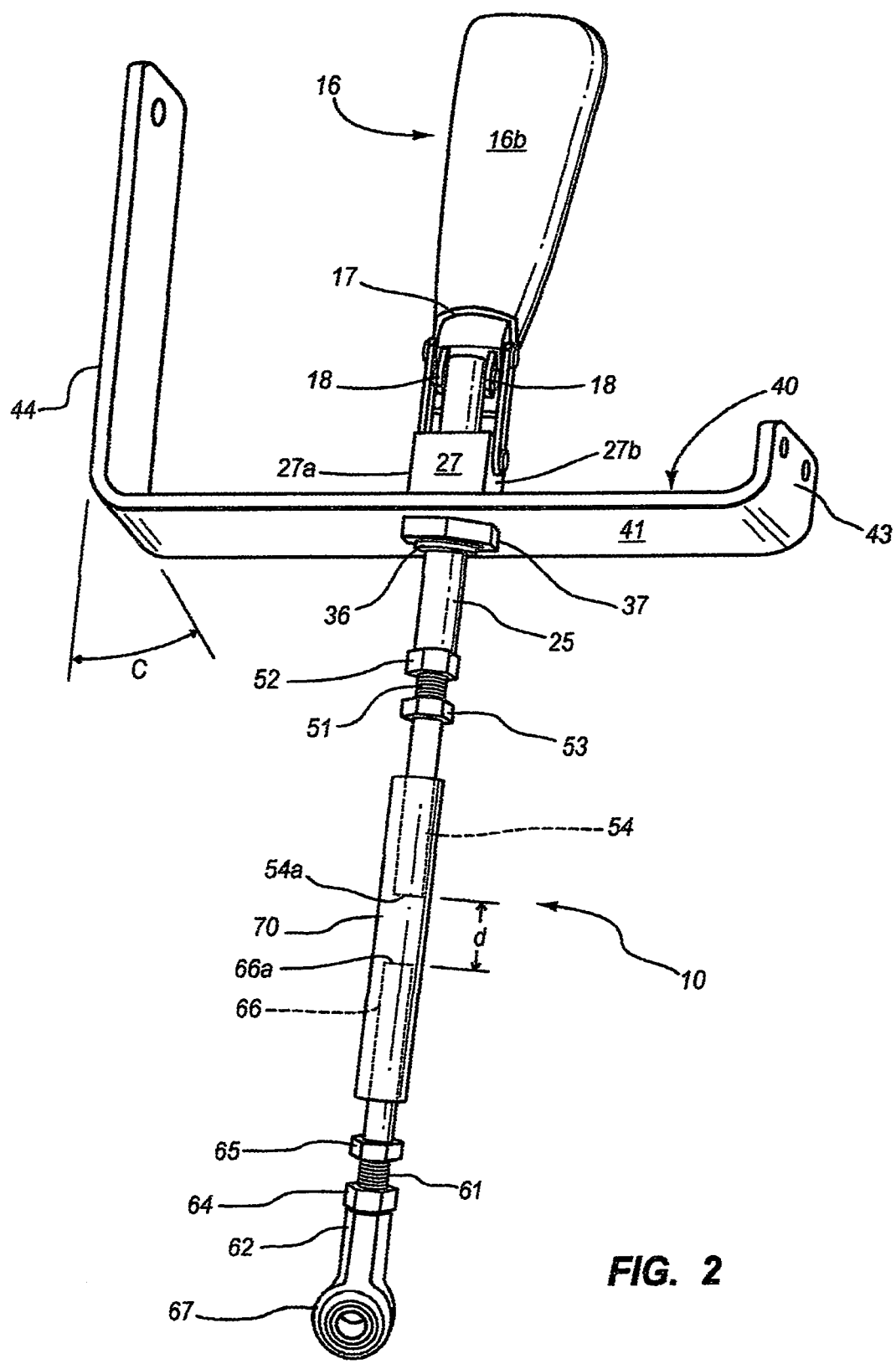
FIG. 2 shows a top plan perspective view of the assembled major components of the ATV parking brake of FIG. 1.
Figure 3:
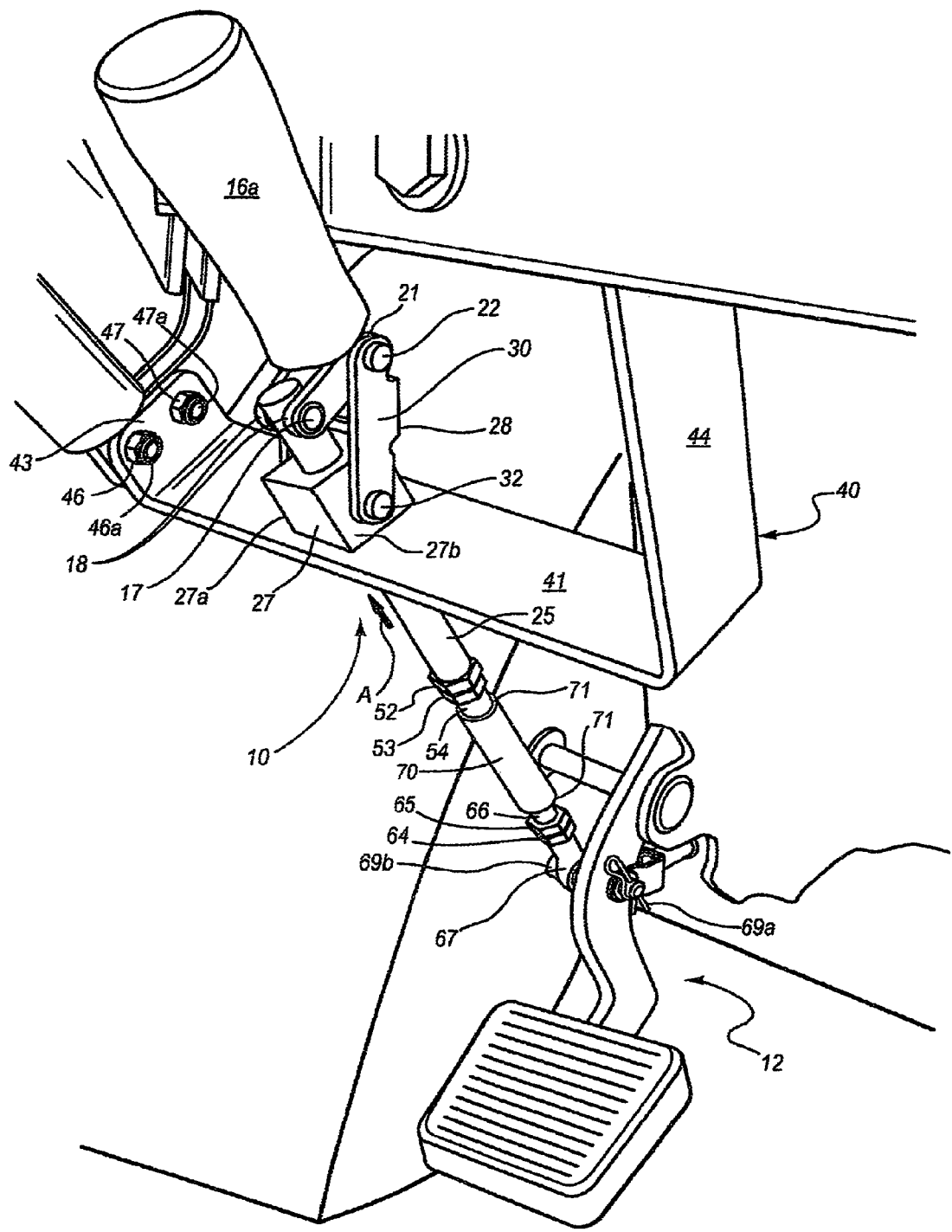
FIG. 3 shows a side elevation perspective assembled view of the major components of FIGS. 1 and 2, and related hardware assembled together and mounted in the ATV drivers compartments, forming the ATV parking brake of the invention, showing a brake handle in a horizontal attitude, extends at approximately perpendicular to a forward face of a flat mounting bracket with the parking brake disengaged.
Figure 4:
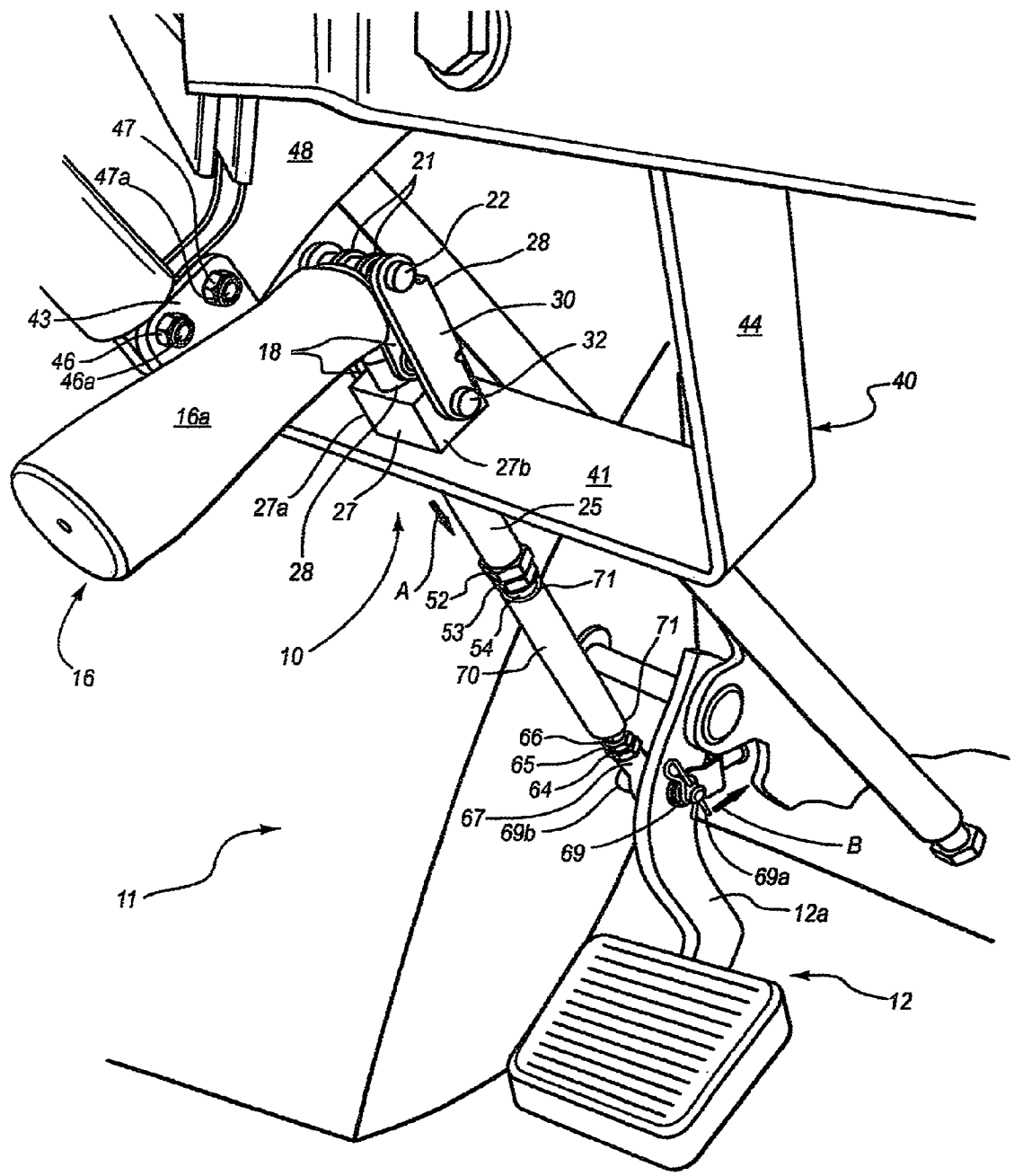
FIG. 4 shows the assembled view of FIG. 3 showing the brake handle as having been rotated downwardly, to be approximately parallel to the forward face of the flat mounting bracket, and extend the parking brake mechanical linkage, illustrated by arrow A, that depresses the brake pedal, illustrated by arrow B, operating the vehicle parking brake.

FIGS. 1 and 2, show exploded and assembled perspective views, respectively, of a parking brake 10 of the invention, less attachment hardware for mounting the parking brake in an ATV's driver's compartment 11, and for connection to the vehicle brake pedal assembly 12, as shown in FIGS. 3 and 4, respectively.

The parking brake 10 is for holding an all terrain vehicle (ATV, UTV, RUV or MUV) or the like, on a slope where the vehicle had formerly relied only on a movement of a vehicle shift lever to "park" to hold the vehicle in place. Such use of the "park" transmission setting places a strain on the transmission and linkage caused by the transmission having to hold the vehicle on the slope, supporting the vehicle weight. In practice, utilizing the "park" transmission setting makes it difficult or impossible to move the vehicle shift back from "park" to "drive" without first neutralizing the force on the transmission exerted by the vehicle weight. Whereas, with an ATV that includes the parking brake of the invention, an operator, wishing to stop and hold the vehicle on a slope, engages the parking brake 10, as illustrated in FIGS. 3 and 4, before they place the vehicle shift lever in "park." So operated, the parking brake 10 will hold the vehicle in place without placing a strain on the transmission and linkage that can be damaged should the operator try to force the shift lever out of "park" with the weight of the vehicle acting on the transmission.

The parking brake 10 as shown in the Figs. is for use as an after market add on for a Polaris® RZR® all terrain vehicle (ATV) that has a transmission that is operated with a shift lever. It should, however, be understood that the parking brake 10 can be arranged for mounting to a similar ATV, UTV, RUV or MUV, within the scope of this disclosure, and may be adapted for use as an original equipment inclusion on an ATV. Shown in the Figs., the parking brake 10 components include a handle assembly 15 that has a manually operated control handle 16 that may be coated with a grip surface 16a. Shown in FIG. 1, the control handle 16 forward end 17 includes a pair of identical brackets 18 that are secured into opposite sides of the handle forward end 17 to be parallel to one another and are spaced apart. Each bracket 18 has a hole 19 formed therethrough that a first pivot 20 is fitted into, and has straight parallel legs 21 with holes 22 formed in the leg 21 ends that second pivots 23 are fitted into. The second pivots 23 connect the legs 21 ends through a pivot shaft to a solid round shaft 25 end section 26, and the solid round shaft 25 is fitted through longitudinal opening 28 formed through a rectangular block 27 to slide freely back and forth. Additionally, the first pivots 20 are fitted through feet ends 31a of a link 30 having opposite feet ends 31b that are each to receive a pivot 32 fitted therethrough, providing a pivot mounting of the link 30 ends onto opposite parallel long sides 27a of the rectangular block 27. The rectangular block 27 is thereby supported to the control handle 16 at spaced apart first and second pivots 20 and 23, respectively.

FIG. 3 shows the parking brake 10 in a released attitude where the control handle 16 is in a horizontal attitude, with the links 30 pivoted downwardly at their pivot mounting 32 to the rectangular block 27 sides 27a. With the rectangular block 27 held in position in the position shown in FIG. 3, the solid round shaft 25 has been moved towards the operator, shown as arrow A, disconnecting the linkage from the brake pedal 12, with the brake pedal spring urging it to a relaxed attitude. To operate the parking brake 10, the linkage is extended, shown at arrow B in FIG. 4, to depress the vehicle brake pedal 12, and as illustrated by arrow B, and will hold the brake pedal 12 in that depressed attitude until an operator pivots the control handle 16 back to the attitude shown in FIG. 3, releasing the brake pedal, as discussed herein below.

FIG. 4 shows the parking brake 10 in an engaged attitude engaging the brake pedal 12 and holding it in a braked attitude. In which attitude the control handle 16 is pointed downwardly, with the straight parallel legs 21 pivoted towards the operator, extending the solid round shaft 25 through the rectangular block. In this position, the links 30 have been pivoted to where they are alongside the rectangular block 27 sides 27a, and tend to hold the handle in place until an operator rotates the control handle 16 upwardly to disengage the parking brake, as shown in FIG. 3 and as discussed herein below.

Shown in FIGS. 1 and 2, the block 27 has a fitting mount 35 formed into its forward end that is open through its center to accommodate the solid round shaft 25 passed therethrough. The fitting mount 35 includes a threaded forward end 36 that a mounting nut 37 is turned onto after passage through a hole 42 formed through a mounting bracket 40 face 41. The mounting bracket 40 provides the flat face 41 that is opposite to the brake pedal 12, and is bent to form short and long ends 43 and 44, respectively, that have a pair of side-by-side holes 43a and 43b and a hole 44a formed in, respectively, the short and long ends 43 and 44, respectively. The holes 43a and 43b of the bracket short end 43 are to receive fasteners, shown in FIGS. 3 and 4, as bolts 46 with nuts 46a turned thereon, after passage of the bolts 46 through holes formed through a steering tilt strut mount 48. The mounting bracket 40 long end 44 is mounted to a center dash board support frame as by fitting a fastener through the long end 44 hole 44a and into the dash board support frame.

For proper parking brake 10 functioning, the solid round shaft 25 and linkage to the brake pedal 12 needs to align so as to avoid binding. Accordingly, the mounting bracket 40 flat face 41 should be flat and perpendicular to the solid round shaft 25. To provide this mounting, the mounting bracket flat face 41 is bent at an angle C, as shown in FIGS. 1 and 2. Which angle C, for the Polaris® RZR®, is approximately seven (7) degrees, through, it should be understood that, for another ATV that the parking brake 10 is suitable for installation on, the mounting bracket face angle to the short and long ends 43 and 44 could be greater or lesser, within the scope of this disclosure.

The linkage for transferring movement of the solid round shaft 25 towards the brake pedal 12 includes the rectangular block 27 having its fitting mount 35 fitted through the hole 42 formed through the mounting bracket flat face 41, and the nut 37 is turned onto the threaded end 36 of the fitting mount. So arranged, the solid round shaft 25 will extend perpendicular from the mounting bracket flat face 41, as shown in FIG. 2. The exploded view of FIG. 1 shows a first guide shaft 50 threaded end section 51 end aligned for turning into a threaded end 49 of the solid round shaft 25, and includes a lock nut 52 turned thereon. The first guide shaft 50 includes the threaded end 49 that terminates on one side of a nut shaped collar 53, and has a straight smooth shaft 54 extending from the opposite side of the nut shaped collar 53. A second guide shaft 60 that has a threaded end section 61 that is shown aligned to turn into a threaded end 63 of a shaft of a rod end bearing 62 and includes a lock nut 64 turned thereon and the threaded end section 61 terminates in a one face of a nut shaped collar 65 that has a straight smooth shaft 66 extending out from the other face thereof. Prior to the linkage assembly, a sleeve 70 is fitted onto the first and second guide shafts 50 and 60 such that, when the brake handle 16 is in a downwardly pointing attitude, as shown in FIG. 4, the sleeve 70 ends 71 will be in contact with the nut shaped collars 53 and 65, respectively, providing a column that transfers the movement of the brake handle 16 from the attitude shown in FIG. 3 to the attitude shown in FIG. 4, into a solid linkage ending in the rod end bearing 62 pivot end 67 that connects through a clevis pin 69 to an arm 12a of the brake pedal 12, shown in FIG. 4, depressing the brake pedal 12. Which pivot end 67 incorporates a bearing that will turn freely and is to receive a fastener, shown as the cotter pin 69, that is passed through washer and through a hole through a brake bracket 12a, through the pivot end 67 and receives a cotter pin 69a fitted through a lateral hole formed through the cotter pin 69 end. So arranged, movement of the linkage to depress the brake pedal 12, as set out above, turns within the bearing within the pin end 67 avoiding binding between the pivot end 67 and the clevis pin 69.

Flat ends 54a and 66a of the first and second guide shafts 50 and 60 solid rod ends 54 and 66, as shown in broken lines in FIG. 2, are spaced apart from one another within the sleeve 70 when the parking brake is not in depressing engagement with the brake pedal 12, as shown in FIG. 3. With the downward movement of the control handle 16 from the horizontal through approximately ninety (90) degrees, as shown in FIG. 4, a columnar linkage through first and second guide shafts 50 and 60 solid rod ends 54 and 66 opposing flat faces 54a and 66a, form a column that depresses the brake pedal 12, as shown by arrow B. An operator pivoting the control handle 16 upwardly, to the attitude shown in FIG. 3, thereby separates the end-to-end contact of the first and second guide shafts 50 and 60, releasing the brake pedal 12. The sleeve 70 has a smooth wall inner surface and is of a diameter to rotate on the first and second guide shafts 50 and 60 smooth solid rod ends 54 and 66, maintaining the first and second guide shafts 50 and 60 alignment during parking brake operations, while prohibiting an interference with an operator freely depressing the brake pedal 12 with their foot to brake the vehicle during driving. The length of which sleeve 70 is selected to allow clearance of the ends 71 thereof from the collars 53 and 65 that are fixed to the first and second guide shafts 50 and 60 at the junction of the their threaded ends 51 and 61, respectively, that are turned into the threaded ends 49 and 63, respectively, of the solid round shaft 25 and the rod end bearing 62, for providing for adjustment of the spacing distance between the first and second guide shaft 50 and 60 smooth solid rod ends 54 and 66 end faces 54a and 66a, respectively. Whereafter, the lock nuts 52 and 64 are turned on the threaded ends 51 and 61, respectively, into engagement with the faces of solid round shaft 25 and rod end bearing, locking the selected spacing distance in place.

In practice, after installation of the described components, some trial and error will be needed to apply an appropriate pressure through the linkage, to operate the parking brake 10. Such adjustment is accomplished, with the brake handle 16 in the attitude shown in FIG. 4, by turning the threaded ends 51 and 61, respectively, of the first and second guide shafts 50 and 60 into or out of the threaded ends of the solid round shaft 25 end 49 and rod end bearing 62 end 63 to where the brake pedal 12 is depressed an appropriate distance to energize the brake system sufficiently to hold the vehicle in place, without over pressurizing the brake pedal. When the desired brake pedal travel is reached, the lock nuts 52 and 64, respectively, are turned into engagement with the solid round shaft end 49 and rod end bearing end 63, respectively, setting the distance the threaded ends 51 and 61 of the first and second guide shafts 62 and 63 extend out from the threaded ends of the solid round shaft 25 and rod end bearing 62, respectively.

While a preferred embodiment of my invention in an all terrain vehicle has been shown and described herein, it should be understood, that although the description above contains many specificities, these should not be construed as limiting the scope of the embodiment but as merely providing illustrations of some of the presently preferred embodiment components. Thus, the scope of the embodiment should be determined by the appended claims and their legal equivalents, rather than by the examples given.

I claim:

1. An all terrain vehicle parking brake comprising:
   a brake pedal movable between a disengaged attitude and an engaged attitude;

a mounting bracket having a length providing a flat face surface and an opening formed therein;

a linkage assembly disposed in relation to said mounting bracket, said linkage assembly comprising a control handle movable between a first position and a second position;

a shaft comprising a length formed between first and second opposing ends, said first end of said shaft pivotably engaging said linkage assembly and wherein said length of said shaft being disposed perpendicular to said flat face surface and extending through said opening in said mounting bracket;

a first guide shaft comprising an elongated length formed between first and second opposing ends, said first end of said first guide shaft engaging said second end of said shaft and said second opposing end of said guide shaft comprising an abutting surface;

a second guide shaft comprising an elongated length formed between first and second opposing ends, said second end of said second guide shaft comprising an abutting surface;

a rod end bearing having a first end engaging said first end of said second guide shaft and second opposing pivot end disposed in pivotal engagement with said brake pedal;

a sleeve comprising two opposing open ends and an inner wall surface having a length and a diameter sufficient to house at least a portion of said elongated length of said first guide shaft introduced within said first open end and further disposed in alignment with at least a portion of said elongated length of said second guide shaft introduced within said second open end, said length of said sleeve being less than the combined elongated lengths of said first and second guide shafts and wherein said sleeve is slidably disposed relative to said elongated lengths of said first and second guide shafts housed therein;

wherein when said control handle is selectively moved into said first position, said abutting surface of said second end of said first guide shaft is disposed in a spaced-apart relationship to said abutting surface of said second end of said second guide shaft within said sleeve, thereby placing said brake pedal in said disengaged attitude; and wherein when said control handle is selectively moved into said second position, said abutting surface of said second end of said first guide shaft structurally engages said abutting surface of said second end of said second guide shaft within said sleeve, thereby selectively locking said brake pedal in said engaged attitude.

2. The all terrain vehicle parking brake as defined in claim 1, wherein said mounting bracket, is mounted to a dash board support frame of an all terrain vehicle.

3. The all terrain vehicle parking brake as defined in claim 1, wherein said control handle comprises a grip surface.

4. The all terrain vehicle parking brake as defined in claim 1, wherein said linkage assembly further comprises, two opposing brackets pivotably securing said control handle to said first end of said shaft.

5. The all terrain vehicle parking brake as defined in claim 1, wherein said elongated length of said first guide shaft is disposed in linear alignment with said elongated length of said shaft.

6. The all terrain vehicle parking brake as defined in claim 1, wherein said first end of said first guide shaft is threaded for fitting into a threaded portion of said second end of said shaft.

7. The all terrain vehicle parking brake as defined in claim 1, wherein said elongated length of said second guide shaft is disposed in linear alignment with said elongated length of said first guide shaft.

8. The all terrain vehicle parking brake as defined in claim 1, wherein said first end of said second guide shaft is threaded for fitting into a threaded portion of said first end of said rod end bearing.

9. The all terrain vehicle parking brake as defined in claim 1, wherein when said brake pedal is selectively positioned in said locked engaged attitude, said control handle is disposed perpendicular to said length of said shaft.

10. The all terrain vehicle parking brake as defined in claim 1, wherein when said brake pedal is selectively positioned in said disengaged attitude, said control handle is disposed in linear alignment with said length of said shaft.

11. The all terrain vehicle parking brake as defined in claim 1, further comprising a first collar engageably disposed along at least a portion of said extended length of said first guide shaft and a second collar engageably disposed along at least a portion of said extended length of said second guide shaft, wherein said first and second collars structurally restrict the slidable movement of said sleeve.

12. An all terrain vehicle parking brake comprising:

a brake pedal movable between a disengaged attitude and an engaged attitude;

a mounting bracket having a length providing a flat face surface and an opening formed therein;

a linkage assembly disposed in relation to said mounting bracket, said linkage assembly comprising a control handle movable between a first position and a second position;

a shaft comprising a length formed between first and second opposing ends, said first end of said shaft pivotably engaging said linkage assembly and wherein said length of said shaft being disposed perpendicular to said flat face surface and extending through said opening in said mounting bracket;

a first guide shaft comprising an elongated length formed between first and second opposing ends, said first end of said first guide shaft engaging said second end of said shaft and said second opposing end of said guide shaft comprising an abutting surface;

a second guide shaft comprising an elongated length formed between first and second opposing ends, said second end of said second guide shaft comprising an abutting surface;

a rod end bearing having a first end engaging said first end of said second guide shaft and a second opposing pivot end disposed in pivotal engagement with said brake pedal;

a sleeve comprising two opposing open ends and an inner wall surface having a length and a diameter sufficient to house at least a portion of said elongated length of said first guide shaft introduced within said first open end and further disposed in alignment with at least a portion of said elongated length of said second guide shaft introduced within said second open end, said length of said sleeve being less than the combined elongated lengths of said first and second guide shafts, and wherein said sleeve is slidably disposed relative to said elongated lengths of said first and second guide shafts introduced therein;

a first collar engageably disposed along at least a portion of said extended length of said first guide shaft and a second collar engageably disposed along at least a portion of said extended length of said second guide shaft, whereby said first and second collars structurally restrict the slidable movement of said sleeve;

wherein when said control handle is selectively moved into said first position, said abutting surface of said second end of said first guide shaft is disposed in a spaced-apart relationship to said abutting surface of said second end of said second guide shaft within said sleeve, thereby placing said brake pedal in said disengaged attitude; and wherein when said control handle is selectively moved into said second position, said abutting surface of said second end of said first guide shaft structurally engages said abutting surface of said second end of said second guide shaft within said sleeve, thereby selectively locking said brake pedal in said engaged attitude.

13. The all terrain vehicle parking brake as defined in claim 12, wherein said mounting bracket is mounted to a dash board support frame of an all terrain vehicle.

14. The all terrain vehicle parking brake as defined in claim 12, wherein said linkage assembly further comprises two opposing brackets pivotably securing said control handle to said first end of said shaft.

15. The all terrain vehicle parking brake as defined in claim 12, wherein said elongated length of said first guide shaft is disposed bilinear alignment with said elongated length of said shaft.

16. The all terrain vehicle parking brake as defined in claim 12, wherein said first end of said first guide shaft is threaded for fitting into a threaded portion of said second end of said shaft.

17. The all terrain vehicle parking brake as defined in claim 12, wherein said elongated length of said second guide shaft is disposed in linear alignment with said elongated length of said first guide shaft.

18. The all terrain vehicle parking brake as defined in claim 12, wherein said first end of said second guide shaft is threaded for fitting into a threaded, portion of said first end of said rod end bearing.

19. The all terrain vehicle parking brake as defined in claim 12, wherein when said brake pedal is selectively disposed in said locked engaged attitude, said control handle is disposed perpendicular to said length of said shaft.

20. The all terrain vehicle parking brake as defined in claim 12, wherein when said brake pedal is selectively disposed in said disengaged attitude, said control handle is disposed in linear alignment with said length of said shaft.

* * * * *

UNITED STATES PATENT AND TRADEMARK OFFICE
CERTIFICATE OF CORRECTION

PATENT NO.         : 8,746,110 B2          Page 1 of 1
APPLICATION NO.    : 13/694402
DATED              : June 10, 2014
INVENTOR(S)        : Gibbs It is certified that error appears in the above-identified patent and that said Letters Patent is hereby corrected as shown below:

On the title page item [71] delete "Pierce IP Law Group PC" and insert therefore
-- Ronnie D. Gibbs --.

In the Claims

Column 9, line 23, claim 15, please delete "bilinear," and insert therefore -- in linear --.

Column 10, line 15, claim 19, after the word "is," please insert -- pivotably --.

Signed and Sealed this
Fourteenth Day of October, 2014

Michelle K. Lee
*Deputy Director of the United States Patent and Trademark Office*